(12) United States Patent
Kim

(10) Patent No.: US 11,207,944 B2
(45) Date of Patent: Dec. 28, 2021

(54) METHOD FOR CONTROLLING AIR-CONDITIONING OF VEHICLE DURING VEHICLE STOPPING OR PARKING

(71) Applicants: HYUNDAI MOTOR COMPANY, Seoul (KR); KIA MOTORS CORPORATION, Seoul (KR)

(72) Inventor: Ick Hwan Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 239 days.

(21) Appl. No.: 16/425,742

(22) Filed: May 29, 2019

(65) Prior Publication Data

US 2020/0180398 A1 Jun. 11, 2020

(30) Foreign Application Priority Data

Dec. 11, 2018 (KR) .......................... 10-2018-0158992

(51) Int. Cl.
*B60H 1/00* (2006.01)
*B60W 10/30* (2006.01)
*B60W 30/18* (2012.01)

(52) U.S. Cl.
CPC ..... *B60H 1/00778* (2013.01); *B60H 1/00278* (2013.01); *B60H 1/00385* (2013.01); *B60H 1/00878* (2013.01); *B60W 10/30* (2013.01); *B60W 30/18054* (2013.01); *B60H 2001/0015* (2013.01)

(58) Field of Classification Search
CPC ............ B60H 1/00778; B60H 1/00278; B60H 1/00385; B60H 1/00878; B60H 2001/0015; B60H 2001/326; B60H 1/00814; B60L 58/12; B60W 30/18054; B60Y 2200/91; B60Y 2200/92; Y02T 10/70

See application file for complete search history.

(56) References Cited

U.S. PATENT DOCUMENTS 5,518,835 A * 5/1996 Simmonds ............ H01M 10/48
  429/90
6,037,749 A * 3/2000 Parsonage .......... G01R 31/3842
  320/132

(Continued)

FOREIGN PATENT DOCUMENTS

KR 10-2014-0065126 A 5/2014
KR 10-1526736 B1 6/2015

*Primary Examiner* — Ljiljana V. Ciric
(74) *Attorney, Agent, or Firm* — Morgan, Lewis & Bockius LLP

(57) ABSTRACT

A method of controlling an air-conditioning system of a vehicle when the vehicle is in an ignition-off state during vehicle stopping or parking, includes receiving, in the ignition-off state, a set air-conditioning time for operating an air-conditioning system of the vehicle and a set air-conditioning target temperature; determining the required air-conditioning energy for operating the air-conditioning system of the vehicle on a basis of the set air-conditioning time and a difference between the set air-conditioning target temperature and an outside temperature of the vehicle; and increasing, by the controller, a set minimum charge amount to be secured in a battery of the vehicle to secure the required air-conditioning energy.

11 Claims, 4 Drawing Sheets

(56) References Cited

U.S. PATENT DOCUMENTS

| | | | | |
|---|---|---|---|---|
| 6,252,377 B1* | 6/2001 | Shibutani | H02J 7/0078 | 320/132 |
| 6,369,460 B1* | 4/2002 | Endoh | B60R 16/03 | 307/31 |
| 6,441,619 B1* | 8/2002 | Araki | G01R 31/392 | 324/427 |
| 6,469,471 B1* | 10/2002 | Anbuky | G01R 31/3648 | 320/118 |
| 6,949,911 B2* | 9/2005 | Laig-Hoerstebrock | G01R 31/389 | 320/132 |
| 6,967,466 B2* | 11/2005 | Koch | G01R 31/3842 | 320/132 |
| 7,012,434 B2* | 3/2006 | Koch | G01R 31/382 | 324/427 |
| 7,061,246 B2* | 6/2006 | Dougherty | B60L 58/12 | 324/426 |
| 7,129,675 B2* | 10/2006 | Brecht | H02J 7/007184 | 320/137 |
| 7,743,649 B1* | 6/2010 | Salman | F02N 11/0862 | 73/114.59 |
| 7,844,391 B2* | 11/2010 | Dietz | F02D 41/2425 | 701/113 |
| 7,999,505 B2* | 8/2011 | Bertness | H02J 7/00047 | 320/104 |
| 8,154,251 B2* | 4/2012 | Oakes | G06Q 40/00 | 320/132 |
| 8,164,343 B2* | 4/2012 | Bertness | G01R 31/006 | 324/503 |
| 8,198,900 B2* | 6/2012 | Bertness | G01R 31/007 | 324/426 |
| 8,290,637 B2* | 10/2012 | Krupadanam | B60W 20/11 | 701/1 |
| 8,408,341 B2* | 4/2013 | Dalum | B60K 6/48 | 180/65.22 |
| 8,446,128 B2* | 5/2013 | Lickfelt | B60L 1/00 | 320/136 |
| 8,493,022 B2* | 7/2013 | Bertness | G01R 31/3648 | 320/104 |
| 8,608,374 B2* | 12/2013 | Hamama | G01K 15/007 | 374/109 |
| 8,662,569 B2* | 3/2014 | Klop | B60K 11/085 | 296/193.1 |
| 8,674,654 B2* | 3/2014 | Bertness | G01R 31/3648 | 320/104 |
| 8,989,954 B1* | 3/2015 | Addepalli | H04W 8/06 | 701/32.3 |
| 9,018,958 B2* | 4/2015 | Bertness | G01R 31/006 | 324/503 |
| 9,043,085 B2* | 5/2015 | Sisk | H02J 7/007 | 701/36 |
| 9,255,955 B2* | 2/2016 | Bertness | G01R 31/006 | |
| 9,744,960 B2* | 8/2017 | Kodawara | B60W 10/26 | |
| 9,902,400 B2* | 2/2018 | Yonan | F02N 11/0814 | |
| 9,987,944 B2* | 6/2018 | Dunlap | B60L 58/12 | |
| 10,000,129 B2* | 6/2018 | Dunlap | B60L 58/12 | |
| 10,118,460 B1* | 11/2018 | Blatchley | H01M 10/625 | |
| 10,195,948 B2* | 2/2019 | O'Hara | H02J 7/007 | |
| 10,195,953 B2* | 2/2019 | Harvey | B60L 53/305 | |
| 10,266,063 B2* | 4/2019 | Ohkawa | G01R 31/387 | |
| 10,279,758 B2* | 5/2019 | Yoneyama | B60R 16/0238 | |
| 10,293,654 B2* | 5/2019 | Treharne | B60H 1/00392 | |
| 10,399,442 B2* | 9/2019 | Harada | B60L 3/0084 | |
| 10,471,966 B2* | 11/2019 | Dudar | B60K 11/085 | |
| 10,479,343 B2* | 11/2019 | Frait | B60K 6/48 | |
| 10,480,477 B2* | 11/2019 | Sangameswaran | F02N 11/0825 | |
| 10,543,757 B2* | 1/2020 | Diab | B60L 1/00 | |
| 10,562,512 B2* | 2/2020 | Miller | B60W 30/18027 | |
| 10,570,872 B2* | 2/2020 | Miller | B60K 6/46 | |
| 10,718,282 B2* | 7/2020 | Dudar | G07C 5/0808 | |
| 10,899,335 B2* | 1/2021 | Ruybal | B60W 20/15 | |
| 10,907,603 B2* | 2/2021 | Caballero Atienzar | F02N 11/08 | |
| 2003/0180583 A1* | 9/2003 | Ichikawa | H01M 10/48 | 429/9 |
| 2005/0017684 A1* | 1/2005 | Brecht | H02J 7/007184 | 320/131 |
| 2005/0274705 A1* | 12/2005 | Zhu | H01M 10/6571 | 219/202 |
| 2009/0015203 A1* | 1/2009 | Oakes | G05B 15/02 | 320/132 |
| 2009/0045815 A1* | 2/2009 | Zhang | B60L 1/14 | 324/426 |
| 2010/0049427 A1* | 2/2010 | Dietz | F02D 41/221 | 701/113 |
| 2013/0144515 A1* | 6/2013 | Okamoto | F02D 45/00 | 701/113 |
| 2013/0269911 A1* | 10/2013 | Carpenter | B60H 1/143 | 165/104.13 |
| 2014/0338376 A1* | 11/2014 | Carpenter | B60L 58/27 | 62/115 |
| 2015/0266357 A1* | 9/2015 | Bidner | B60H 1/00778 | 165/288 |
| 2015/0361939 A1* | 12/2015 | Iwasaki | B60W 10/30 | 701/112 |
| 2017/0015208 A1* | 1/2017 | Dunlap | B60L 58/12 | |
| 2017/0122239 A1* | 5/2017 | Li | G01C 21/26 | |
| 2017/0129359 A1* | 5/2017 | Dunlap | B60L 1/02 | |
| 2017/0267113 A1* | 9/2017 | Harada | B60L 3/0084 | |
| 2018/0118351 A1* | 5/2018 | Frait | B60W 10/02 | |
| 2018/0154793 A1* | 6/2018 | Jun | B60L 1/02 | |
| 2018/0293816 A1* | 10/2018 | Garrett | B60R 16/0234 | |
| 2018/0319243 A1* | 11/2018 | Blatchley | H01M 10/613 | |
| 2019/0031199 A1* | 1/2019 | Dudar | B60W 10/30 | |
| 2019/0054827 A1* | 2/2019 | Jiang | H02J 7/0024 | |
| 2019/0064849 A1* | 2/2019 | O'Hara | G05D 1/0297 | |
| 2019/0067961 A1* | 2/2019 | King | H02J 7/1446 | |
| 2020/0003143 A1* | 1/2020 | Dudar | B60W 10/22 | |
| 2021/0103292 A1* | 4/2021 | O'Hara | B60L 58/12 | |

* cited by examiner

METHOD FOR CONTROLLING AIR-CONDITIONING OF VEHICLE DURING VEHICLE STOPPING OR PARKING

CROSS REFERENCE TO RELATED APPLICATION

The present application claims priority to Korean Patent Application No. 10-2018-0158992, filed Dec. 11, 2018, the entire contents of which is incorporated herein for all purposes by this reference.

BACKGROUND OF THE INVENTION

Field of the Invention

The present invention relates generally to a method of controlling air-conditioning of a vehicle during stopping or parking and, more particularly, to a method of controlling air-conditioning of a vehicle which can perform smooth air-conditioning of the vehicle using power stored in a battery during vehicle stopping or parking.

Description of Related Art

An eco-friendly vehicle such as an electric vehicle, a hybrid vehicle, a plug-in hybrid vehicle, or a fuel cell vehicle is a vehicle that generates driving force by generating rotational force of a wheel using an electric motor. The eco-friendly vehicle has a high-voltage/high-capacity main battery that stores electrical energy provided to the electric motor supplying rotational force to the wheel.

Therefore, a general internal combustion engine vehicle cannot operate a vehicle air-conditioning system in a state in which an engine stops, that is, in an ignition-off state. However, the eco-friendly vehicle can operate the vehicle air-conditioning system using power stored in the main battery.

However, a residual charge amount of the main battery after vehicle driving may vary depending on driving environment of the vehicle or driving propensity of a driver. Accordingly, when the residual charge amount of the main battery during vehicle stopping or parking after driving is not sufficiently secured to operate the vehicle air-conditioning system, it is difficult to operate the vehicle air-conditioning system after the vehicle is turned off.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of controlling air-conditioning of a vehicle, whereby it is possible to secure sufficient battery power suitable for air-conditioning time and environmental temperature required by a driver in advance when a vehicle air-conditioning system is required to be operated in a state of vehicle stopping or parking after the vehicle ignition is turned off.

In various aspects of the present invention, there is provided a method of controlling air-conditioning of a vehicle when a vehicle is in an ignition-off state during vehicle stopping or parking, the method may include: inputting, in the ignition-off state, a set air-conditioning time for operating an air-conditioning system of the vehicle and a set air-conditioning target temperature; deriving required air-conditioning energy for operating the air-conditioning system of the vehicle on the basis of the set air-conditioning time and a difference between the setting of the set air-conditioning target temperature and an outside temperature of the vehicle; and driving the vehicle by increasing a set minimum charge amount to be secured in a battery of the vehicle to secure the required air-conditioning energy.

In the determining the required air-conditioning energy, a destination of the vehicle driving and an estimated outside temperature at the destination as the outside temperature of the vehicle may be input, and the required air-conditioning energy may be derived on a basis of the set estimated outside temperature at the destination, and the set target air-conditioning target temperature, and the air-conditioning time.

In the determining the required air-conditioning energy, time between estimated destination arrival time and time after the set air-conditioning time from the estimated destination arrival time may be divided into a preset unit time, an outside temperature for each the unit time may be estimated on the basis of an estimated outside temperature of the estimated destination arrival time and an estimated outside temperature of the time after the set air-conditioning time from the estimated destination arrival time, and energy required for air-conditioning per the unit time may be determined on the basis of the set air-conditioning target temperature and the outside temperature estimated for each unit time, then the energy required for air-conditioning for each unit time may be summed up to derive the required air-conditioning energy.

In the driving of the vehicle, a ratio of the required air-conditioning energy in total charging capacity of the battery may be determined to derive a required charge amount to be secured corresponding to the required air-conditioning energy, and for a case where air-conditioning is not required in the ignition-off state, the required charge amount to be secured may be added to a preset default minimum charge amount of the battery to determine a minimum charge amount for air-conditioning, changing a set minimum charge amount by the minimum charge amount for air-conditioning.

In the driving of the vehicle, a driving mode while vehicle driving may be determined such that the minimum charge minimum charge amount of the battery remains a value greater than the minimum charge amount for air-conditioning.

The method may further include: checking a residual charge amount of the battery after the vehicle ignition is turned off, and comparing the residual charge amount with a preset default minimum charge amount corresponding to a value before increasing the set minimum charge amount; and when the residual charge amount is greater than the default minimum charge amount, performing the air-conditioning of the vehicle when door opening is recognized in the vehicle being in an ignition-off state.

The method may further include: after the comparing, when the residual charge amount is greater than the default minimum charge amount, determining air-conditioning available time based on an energy amount corresponding to the vehicle, the outside temperature of the vehicle and the air-conditioning target temperature of the vehicle.

In the performing the air-conditioning of the vehicle, the air-conditioning of the vehicle may be performed for the air-conditioning available time.

In the performing the air-conditioning of the vehicle, the comparing and determining the air-conditioning available time may be repeated after first vehicle air-conditioning is performed, and when the residual charge amount is less than or equal to the default minimum charge amount in the repeated comparing, the air-conditioning of the vehicle may be terminated.

In the performing the air-conditioning of the vehicle, the comparing and determining the air-conditioning available time may be repeated after first vehicle air-conditioning is performed, and when the residual charge amount is less than or equal to the default minimum charge amount in the repeated comparing, the vehicle ignition may be turned on, continuing the air-conditioning of the vehicle.

According to the above-mentioned method of controlling the air-conditioning of the vehicle during vehicle stopping or parking, by securing the charge amount of the battery sufficiently while vehicle driving, the vehicle air-conditioning may be smoothly performed in the ignition-off state after driving finishes.

By the method of controlling the air-conditioning of the vehicle during vehicle stopping or parking, the charge amount of the battery to be secured may be properly adjusted in consideration of time set by the driver or temperature at which the driver arrives through vehicle operation, increasing convenience of the driver.

Furthermore, by the method of controlling the air-conditioning of the vehicle during vehicle stopping or parking, the vehicle air-conditioning may be smoothly controlled in the ignition-off state. Therefore, it is unnecessary to drive an engine again for air-conditioning, so that the fuel efficiency may be increased and vehicle noise and exhaust gas may be decreased.

The effects obtained as an exemplary embodiment of the present invention are not limited to the above-mentioned effects, and other effects not mentioned may be clearly understood by one of ordinary skill in the art to which the present invention belongs from the description hereinafter.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
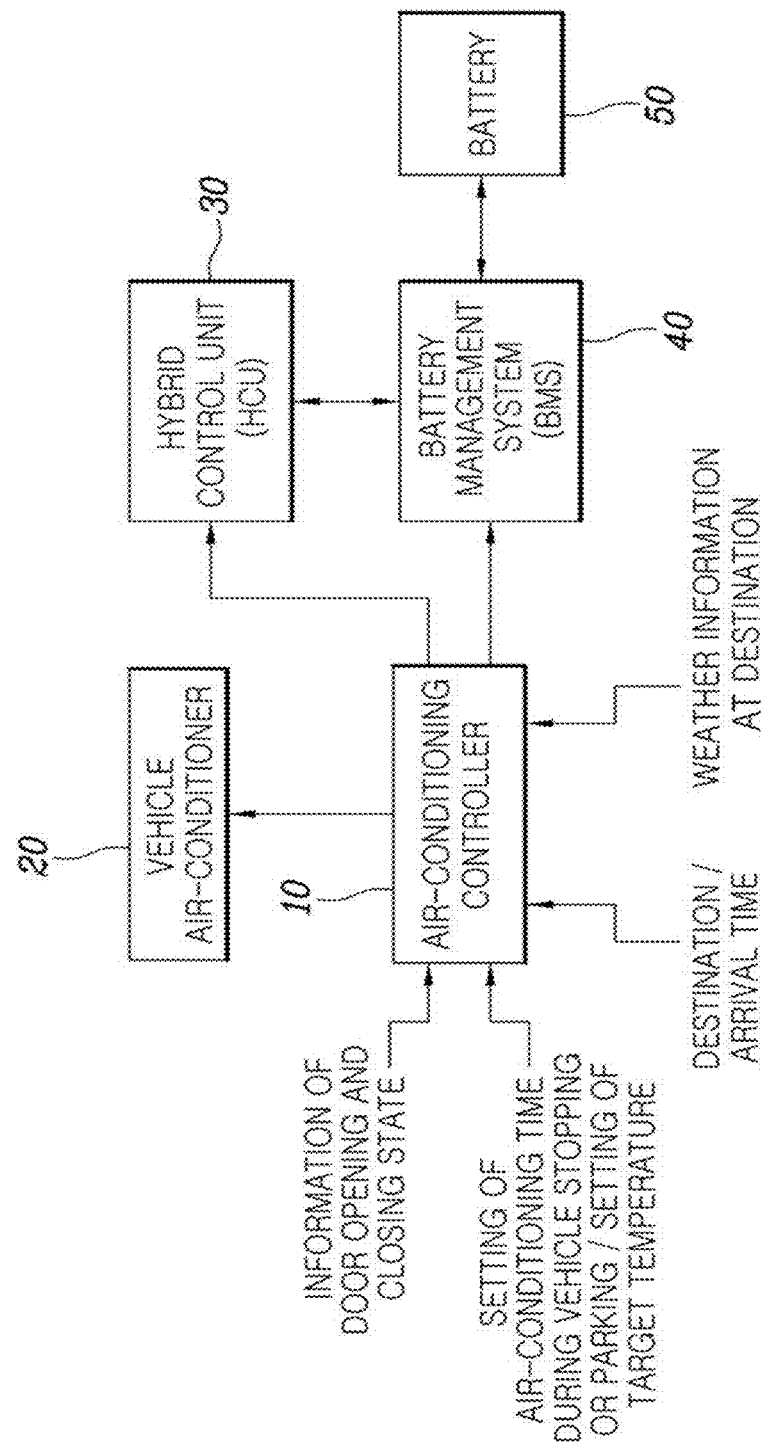
FIG. 1 is a block diagram showing an example of a system to which a method of controlling air-conditioning of a vehicle is applied during vehicle stopping or parking according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, various embodiments of an air-conditioning control method of a vehicle according to an exemplary embodiment of the present invention will be described in detail with reference to the accompanying drawings.

FIG. 1 is a block diagram showing an example of a system to which a method of controlling air-conditioning of a vehicle is applied during vehicle stopping or parking according to an exemplary embodiment of the present invention.

Referring to FIG. 1, the system to which the method of controlling the air-conditioning of the vehicle is applied during vehicle stopping or parking according to the exemplary embodiment of the present invention may include an air-conditioning controller 10. The air-conditioning controller 10 may include a processor in which an algorithm is programmed to realize the method of controlling the air-conditioning of the vehicle during vehicle stopping or parking according to the exemplary embodiment of the present invention and a memory for storing information required to realize the algorithm. In an actual vehicle, the air-conditioning controller 10 may be one of several electronic control units configured for controlling an air conditioner 20 in the vehicle.

The air-conditioning controller 10 may receive information such as settings of time at which air-conditioning is performed during vehicle stopping or parking after the vehicle ignition is turned off, a destination of the vehicle driving and destination arrival time, and weather of destination and/or an opening and closing state of a vehicle door.

The setting of time at which air-conditioning is performed during vehicle stopping or parking after the vehicle ignition is turned off may be information which is input by a driver using an input device provided in the vehicle. Hereinafter, for convenience of description, the air-conditioning performed during vehicle stopping or parking after the vehicle ignition is turned off is referred to as 'air-conditioning without engine running' in short.

Furthermore, the air-conditioning controller 10 may receive information related to a target temperature set by the driver. A setting of the target temperature may be input by the input device provided in the vehicle.

The destination or the arrival time may be input to the controller by the driver or through a navigation system of the vehicle.

The weather information related to the destination is input to the controller through a weather information guide application installed in an infotainment system of the vehicle or a weather information guide application installed in a driver's personal terminal which is connected to a wired or wireless network to exchange information with the vehicle.

The door opening and closing information may be input to the controller from a sensor provided in the vehicle door.

The air-conditioning controller 10 may determine an energy amount required for the air-conditioning without engine running on the basis of the input information, and allow a charge state of a battery 50 to be controlled so that the determined energy amount may be secured. For example, when the air-conditioning controller 10 provides the energy amount that should be secured for the air-conditioning without engine running to a hybrid control unit (HCU) 30, the HCU 30 may control electric vehicle mode operation of a hybrid vehicle, so that the energy amount that should be secured for the air-conditioning without engine running may be left in the battery 50 by checking the charge state of the battery 50 through information exchange with a battery management system (BMS) 40.

Since the battery 50 is charged while stopping motor driving and running using the engine when the vehicle is in a run state where the charge amount of the battery 50 is insufficient, the present invention is suitable for being applied to a hybrid vehicle using both an engine and a motor as drive source rather than a pure electric vehicle.

To perform the air-conditioning without engine running after the vehicle ignition is turned off, the air-conditioning controller 10 operates the air conditioner 20 of the vehicle. In the instant case, the air-conditioning controller 10 checks a residual charge amount of the battery 50 through the BMS 40. When the charge amount is sufficiently secured, the air-conditioning controller 10 determines operable air-conditioning time, and then may operate the air conditioner 20 depending on an opening or closing state of the vehicle door.

Figure 2:
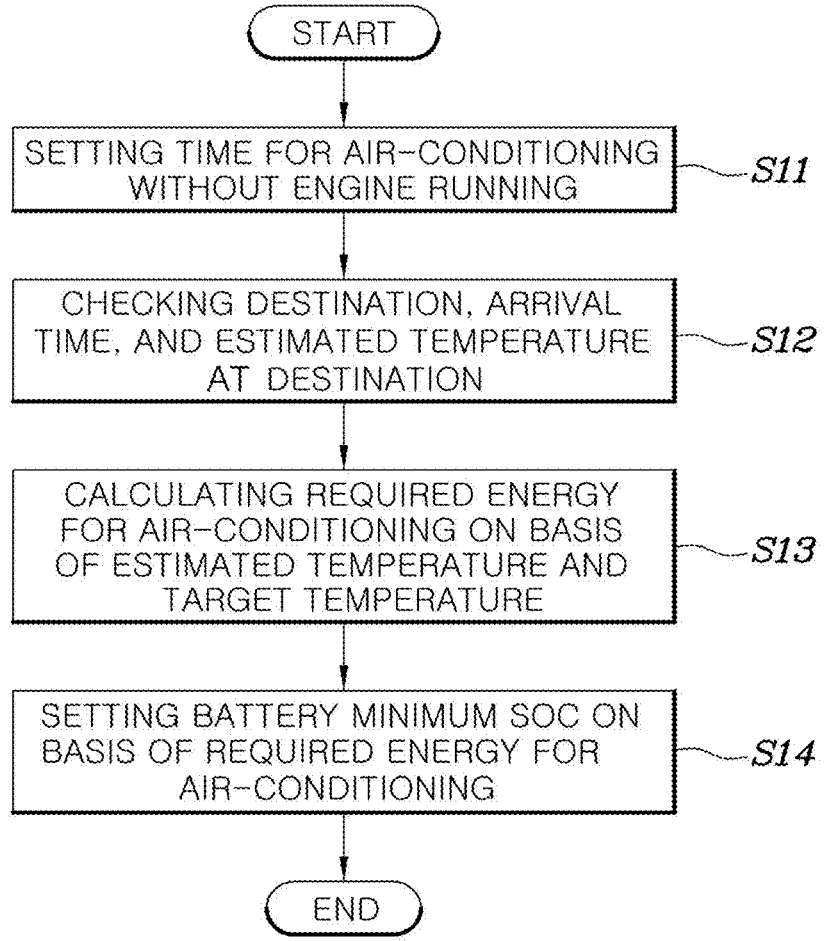
FIG. 2 is a flowchart showing a method of securing a charge amount of a battery in the method of controlling the air-conditioning of the vehicle during vehicle stopping or parking according to the exemplary embodiment of the present invention.

FIG. 2 is a flowchart showing a method of securing a charge amount of a battery in the method of controlling the air-conditioning of the vehicle during vehicle stopping or parking according to the exemplary embodiment of the present invention.

Referring to FIG. 2, the method of controlling the air-conditioning of the vehicle during vehicle stopping or parking according to the exemplary embodiment of the present invention may start from inputting a preset time for the air-conditioning without engine running in step S11.

Step S11 may be a step in which the driver inputs a desired time for the air-conditioning without engine running using the input device provided in the vehicle, for example, a display screen of the infotainment system, etc., and the air-conditioning controller 10 receives applicable information.

As an exemplary embodiment of the present invention, the time for the air-conditioning without engine running may be set in advance as default. In step S11, the air-conditioning controller 10 may receive just information that the driver set up to perform the air-conditioning without engine running.

That is, step S11 may be understood as a step of setting whether or not the air-conditioning without engine running is performed and of setting a time at which the air-conditioning without engine running is performed after the vehicle ignition is turned off at a subsequent time.

Furthermore, in step S11, the air-conditioning controller 10 may receive a target temperature of the air-conditioning without engine running. The target temperature may be input thereto through the input device configured for air-conditioning adjustment provided in the vehicle.

Subsequently, the air-conditioning controller 10 may check the input various information in step S12. When the driver sets the driving destination through the navigation system of the vehicle, the air-conditioning controller 10 may check the destination and estimated destination arrival time, which are set in the navigation system. Furthermore, the air-conditioning controller 10 may check a temperature from the estimated destination arrival time to the time for the air-conditioning without engine running on the basis of the estimated destination arrival time of the navigation system and the time for the air-conditioning without engine running set in step S11. For example, when the estimated destination arrival time is ten o'clock and the set time for the air-conditioning without engine running is one hour, the air-conditioning controller 10 may check temperature information related to the destination from ten o'clock to eleven o'clock. As described above, the temperature information may be checked by being received from the weather information guide application disposed in the infotainment system of the vehicle or the weather information guide application disposed in the driver's personal terminal which is connected to the wired or wireless network to exchange information with the vehicle.

As such, the air-conditioning controller 10 may determine energy required for the air-conditioning without engine running on the basis of a difference between the estimated temperature information related to the destination and the target temperature in step S13.

In step S13, the air-conditioning controller 10 may check the driving destination and the temperature information related to the destination provided by the vehicle navigation system or driver's input, and may determine the energy required for the air-conditioning without engine running.

For example, when the set time for the air-conditioning without engine running is one hour, the destination estimated destination arrival time is ten o'clock, the air-conditioning target temperature is 23° C., destination estimated temperature at ten o'clock of the weather information is 25° C., and estimated temperature at eleven o'clock is 31° C., in step S13, the air-conditioning controller 10 may determine the energy required to perform the air-conditioning without engine running for one hour from ten o'clock to eleven o'clock as follows.

The air-conditioning controller 10 divides the set time for the air-conditioning without engine running into a preset unit time, and derives an estimated temperature for each unit time, on the basis of an estimated temperature of time at which the air-conditioning without engine running starts, that is, the destination arrival time and an estimated temperature of time at which the air-conditioning without engine running is terminated. For example, when the preset unit time is ten minutes, the air-conditioning controller 10 may divide time for the air-conditioning without engine running from ten o'clock to eleven o'clock into units of ten minutes. Subsequently, the air-conditioning controller 10 estimates temperature for each unit time based on an estimated temperature at ten o'clock and an estimated temperature at eleven o'clock. As such, the air-conditioning controller 10 may derive energy required for air-conditioning for each unit time on the basis of the target temperature of the air-conditioning without engine running and the estimated temperature for each unit time.

An example of the above-described derivation of consumed energy for each unit time is summarized in Table 1 below.

TABLE 1

| Time | 10:00 | 10:10 | 10:20 | 10:30 | 10:40 | 10:50 | 11:00 |
|---|---|---|---|---|---|---|---|
| Outdoor temperature | 25° C. | 26° C. | 27° C. | 28° C. | 29° C. | 30° C. | 31° C. |
| Required energy | 0.1 kWh | 0.1 kWh | 0.2 kWh | 0.2 kWh | 0.2 kWh | 0.3 kWh | 0.3 kWh |

In a method of deriving the consumed energy by the air-conditioning controller 10, the consumed energy may be derived by being determined through various determination techniques known in the art or using data map provided in advance. For example, information related to the target temperature, the outside temperature when air-conditioning starts, and required energy depending on variation of the outside temperature is derived in advance by an experimental method, and then the present information is stored in the memory, etc. in the air-conditioning controller 10. The air-conditioning controller 10 inputs the received information related to the target temperature (that is, 23° C. in the above example), the outside temperature when air-conditioning starts (that is, 25° C. in the above example), and the variation of the temperature for each unit time (that is, temperature variation starting from 25° C. in the above example) in the pre-stored data map, deriving required energy amount corresponding thereto.

Subsequently, the air-conditioning controller 10 may change setting of minimum charge amount that the vehicle battery may secure to secure the energy required for air-conditioning in step S14.

In step S14, the air-conditioning controller 10 derives, considering the energy required for the air-conditioning without engine running and total charge amount of the battery 50, the charge amount of the battery 50 corresponding to the energy required for the air-conditioning without engine running (that is, State Of Charge: SOC). Furthermore, the air-conditioning controller 10 may change the setting of the minimum charge amount of the battery 50 to secure the charge amount corresponding to the energy required for the air-conditioning without engine running.

As the example described above in Table 1, when required energy is determined, in step S14, the air-conditioning controller 10 adds the required charge amount for each unit time, and determines total required energy of 1.4 kWh required for the time for the air-conditioning without engine running, first. As such, when the total charge amount of the battery 50 is 8.9 kWh, the minimum charge amount of the battery 50 may be changed so that the charge amount 1.4 kWh, which is the charge amount corresponding to "1.4/8.9×100%≈15.7%", may be further secured.

Figure 3:
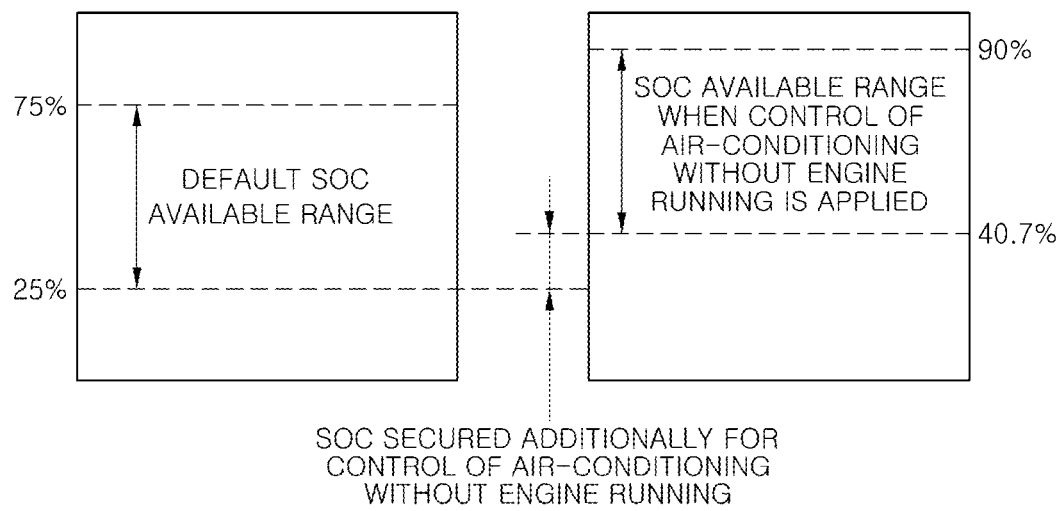
FIG. 3 is a view showing an example of the charge amount of the battery which is secured by the method of FIG. 2.

FIG. 3 is a view showing an example of the charge amount of the battery which is secured by the method of FIG. 2.

In a case of an eco-friendly vehicle generating a driving force by driving a motor by a battery, the battery is managed while vehicle driving so that the charge amount of the battery remains within a preset available range. An example in a right side of FIG. 3 shows a general case in which control without engine running is performed, for example, the eco-friendly vehicle manages the battery while vehicle driving so that a maximum charge amount is 75% and a minimum charge amount is 25%.

As the exemplary embodiment of the present invention, in the case of performing the air-conditioning without engine running, energy required for the air-conditioning without engine running is estimated in the same manner as described above, and setting of the minimum charge amount of the battery 50 may be changed to secure corresponding energy. That is, when the air-conditioning without engine running is not performed, setting of the minimum charge amount of 25% is changed to 40.7% by reflecting the charge amount of 15.7% corresponding to the determined required energy, as described above. Therefore, an additional charge amount may be secured to control the air-conditioning without engine running.

That is, while vehicle driving, the air-conditioning controller 10 provides a changed minimum charge amount of the battery to the HCU 30 or the BMS 40, and the HCU 30 or the BMS 40 determine a driving mode of the hybrid vehicle in consideration of setting of the changed minimum charge amount of the battery.

Figure 4:
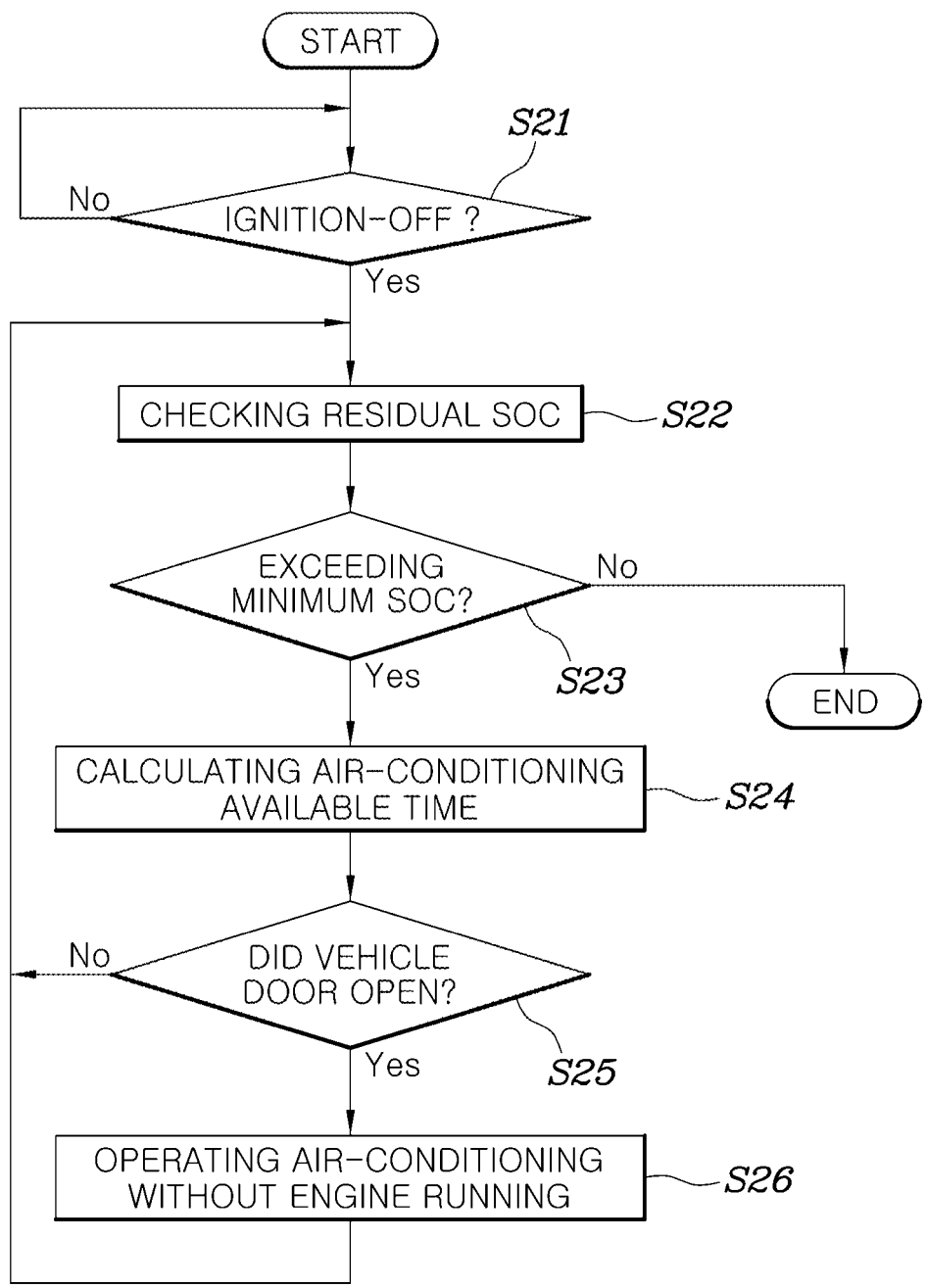
FIG. 4 is a flowchart showing a method of operating the air-conditioning system after the vehicle ignition is turned off in the method of controlling the air-conditioning of the vehicle during vehicle stopping or parking according to the exemplary embodiment of the present invention.

FIG. 4 is a flowchart showing a method of operating the air-conditioning system after the vehicle ignition is turned off in the method of controlling the air-conditioning of the vehicle during vehicle stopping or parking according to the exemplary embodiment of the present invention.

The above description about FIG. 2 and FIG. 3 relates to securement of energy of the battery 50 to a level at which the air-conditioning without engine running is performed while vehicle driving by setting the minimum charge amount which is changed before driving. FIG. 4 relates to operation of the air-conditioning without engine running when the vehicle driving is finished and the ignition is turned off.

When the vehicle is set to perform the air-conditioning without engine running, and the ignition is turned off in step S21, the air-conditioning controller 10 checks the residual charge amount of the battery 50 through the HCU 30 or the BMS 40 in step S22, and checks whether or not the residual charge amount of the battery 50 is secured over the minimum charge amount in step S23.

In step S23, the minimum charge amount of the battery 50 used to check securement of the residual charge amount is not a setting value of the minimum charge amount changed through FIG. 2 and FIG. 3, but is minimum charge amount corresponding to a minimum level that does not adversely affect the battery 50. That is, as shown in a left side of FIG. 3, the minimum charge amount of the battery 50 may be the minimum charge amount which is set as a general case in which the air-conditioning without engine running is not performed.

When the residual charge amount of the battery 50 is greater than the minimum charge amount, the air-conditioning controller 10 may determine air-conditioning available time using energy corresponding to a difference between the residual charge amount and the minimum charge amount in step S24. The air-conditioning available time determined in step S24 may be determined on the basis of air-conditioning available energy corresponding to the difference between the residual charge amount and the minimum charge amount, outside temperature, and the target temperature. Similarly to operating the air-conditioning required energy in step S13 of FIG. 2, determination of the air-conditioning available time in step S24 may be performed using techniques known in the art, and may be performed using the data map in which the air-conditioning available time depending on the air-conditioning available energy, the outside temperature, and the target temperature is determined in the experimental method in advance and stored.

As such, the air-conditioning controller 10 may recognize that the door is open and then closed, and may perform the air-conditioning without engine running from moment the driver leaves the vehicle in step S26.

After the air-conditioning without engine running is performed, the air-conditioning without engine running may be performed for the air-conditioning available time which is the same as the derived value in step S24, and then may be terminated. However, since the charge amount of the battery 50 may vary depending on an environmental change such as outside temperature variation of the vehicle, during the air-conditioning without engine, the residual charge amount of the battery in step S22 is checked and compared with the setting of the minimum charge amount to determine whether or not the air-conditioning is terminated in advance.

Furthermore, when the residual charge amount of the battery 50 in step S23 is smaller than the minimum charge amount, an engine ignition of the hybrid vehicle is turned on, so that air-conditioning may be performed for the air-conditioning time set by the driver.

Hereinabove, in the case of the method of controlling the air-conditioning of the vehicle during vehicle stopping or parking according to various embodiments of the present invention, the charge amount of the battery is sufficiently secured while vehicle driving, allowing the air-conditioning of the vehicle to be smoothly performed in an ignition-off state. The method of controlling the air-conditioning of the vehicle during vehicle stopping or parking according to various embodiments of the present invention properly adjusts the charge amount of the battery to be secured in consideration of the destination temperature or time set by the driver, increasing convenience of the driver.

Moreover, in the case of the method of controlling the air-conditioning of the vehicle during vehicle stopping or parking according to various embodiments of the present invention, since it is possible to smoothly control the air-conditioning of the vehicle even when the vehicle is in the ignition-off state, it is unnecessary to restart the engine for air-conditioning, increasing fuel efficiency and decreasing vehicle noise and exhaust gas.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling air-conditioning of a vehicle when the vehicle is in an ignition-off state during vehicle stopping or parking, the method comprising:
   receiving, by a controller, in the ignition-off state, a set air-conditioning time for operating an air-conditioning system of the vehicle and a set air-conditioning target temperature;
   determining, by the controller, required air-conditioning energy for operating the air-conditioning system of the vehicle on a basis of the set air-conditioning time and a difference between the set air-conditioning target temperature and an outside temperature of the vehicle; and
   increasing, by the controller, a set minimum charge amount to be secured in a battery of the vehicle to secure the required air-conditioning energy.

2. The method of controlling the air-conditioning of the vehicle of claim 1, wherein, in the determining the required air-conditioning energy, a destination of vehicle driving and an estimated outside temperature at the destination as the outside temperature of the vehicle are input to the controller, and the required air-conditioning energy is determined by setting the estimated outside temperature at the destination, and by the set target air-conditioning target temperature and the set air-conditioning time.

3. The method of controlling the air-conditioning of the vehicle of claim 2, wherein, in the determining the required air-conditioning energy,
   time between estimated destination arrival time and time after the set air-conditioning time from the estimated destination arrival time is divided into a predetermined unit time,
   an outside temperature for each the unit time is estimated on a basis of an estimated outside temperature of the estimated destination arrival time and an estimated outside temperature of a time after the set air-conditioning time from the estimated destination arrival time, and
   energy required for air-conditioning per the unit time is determined on a basis of the set air-conditioning target temperature and the outside temperature estimated for each unit time, and then the energy required for air-conditioning for each unit time is summed up to derive the required air-conditioning energy.

4. The method of controlling the air-conditioning of the vehicle of claim 1, wherein, in driving of the vehicle,
   a ratio of the required air-conditioning energy in total charging capacity of the battery is determined to derive a required charge amount to be secured corresponding to the required air-conditioning energy.

5. The method of controlling the air-conditioning of the vehicle of claim 4, wherein, in the driving of the vehicle,
   when the air-conditioning is not required in the ignition-off state, the required charge amount to be secured is added to a predetermined default minimum charge amount of the battery to determine a minimum charge amount for the air-conditioning, changing the set minimum charge amount by a minimum charge amount for air-conditioning.

6. The method of controlling the air-conditioning of the vehicle of claim 5, wherein, in the driving of the vehicle, a driving mode while vehicle driving is determined such that the set minimum charge amount of the battery remains a value greater than the minimum charge amount for air-conditioning.

7. The method of controlling the air-conditioning of the vehicle of claim 1, further including:
checking a residual charge amount of the battery after vehicle ignition is turned off, and comparing the residual charge amount with a predetermined default minimum charge amount corresponding to a value before increasing the set minimum charge amount; and
when the residual charge amount is greater than the predetermined default minimum charge amount, performing the air-conditioning of the vehicle when door opening is recognized in the vehicle being in the ignition-off state.

8. The method of controlling the air-conditioning of the vehicle of claim 7, further comprising:
after the comparing, when the residual charge amount is greater than the predetermined default minimum charge amount, determining air-conditioning available time based on an energy amount corresponding to the vehicle, the outside temperature of the vehicle, and the air-conditioning target temperature of the vehicle.

9. The method of controlling the air-conditioning of the vehicle of claim 8, wherein, in the performing the air-conditioning of the vehicle, the air-conditioning of the vehicle is performed for the air-conditioning available time.

10. The method of controlling the air-conditioning of the vehicle of claim 8, wherein,
in the performing the air-conditioning of the vehicle, the comparing and determining the air-conditioning available time are repeated after first vehicle air-conditioning is performed, and
when the residual charge amount is less than or equal to the predetermined default minimum charge amount in the repeated comparing, the air-conditioning of the vehicle is terminated.

11. The method of controlling the air-conditioning of the vehicle of claim 8, wherein,
in the performing the air-conditioning of the vehicle, the comparing and determining the air-conditioning available time are repeated after first vehicle air-conditioning is performed, and
when the residual charge amount is less than or equal to the predetermined default minimum charge amount in the repeated comparing, the vehicle ignition is turned on, continuing the air-conditioning of the vehicle.

* * * * *